United States Patent [19]

Humphrey

[11] 4,182,572

[45] Jan. 8, 1980

[54] LENSMETER UTILIZING NON-PARALLEL LIGHT

[75] Inventor: William E. Humphrey, San Leandro, Calif.

[73] Assignee: Humphrey Instruments Inc., San Leandro, Calif.

[21] Appl. No.: 813,646

[22] Filed: Jul. 5, 1977

[51] Int. Cl.$^2$ .......................... G01B 9/00; G01D 5/36
[52] U.S. Cl. .................................... 356/127; 250/233
[58] Field of Search ............................. 356/124–127, 356/128; 250/237 R, 237 G, 233

[56] References Cited

U.S. PATENT DOCUMENTS

| | | | |
|---|---|---|---|
| 2,640,392 | 6/1953 | Freeman | 356/125 |
| 2,997,699 | 8/1961 | Lovell | 250/233 |
| 3,446,559 | 5/1969 | Astheimer et al. | 356/128 |
| 3,606,548 | 9/1971 | Dyson | 356/128 |
| 3,614,239 | 10/1971 | Kissell | 250/233 |
| 3,880,525 | 8/1975 | Johnson | 356/127 |

*Primary Examiner*—Conrad J. Clark
*Attorney, Agent, or Firm*—Townsend and Townsend

[57] ABSTRACT

A unitary light source is imaged through a prism array to generate a plurality of preferably four apparent light sources forming a point of origin for a discrete lens sampling light path. From each apparent light source, each discrete sampling path diverges to a relay lens system. This relay lens system relays and registers to a lens sampling interval discrete images of each apparent light source. The images may be registered to a correspondingly apertured lens sampling diaphragm against which suspect optics are placed for measurement. A moving boundary locus sweeps the light between each apparent source and the sampling interval with paired boundaries of differing slopes which produce non-ambiguous points of intersection with respect to time. After passage through the suspect optics at the sampling interval, light is passed to a photodetector having an overlying set of apertures, each aperture corresponding to one of the four apparent light sources. A lens pair functions as relay optics to focus a conjugate image of the light at the suspect optics to the overlying apertures at the detector. Light other than that passing through the suspect optics at the point of the images of the apparent light source is excluded. Moreover, a sampling aperture in combination with one of the lenses of the relay pair, passes only that light with limited angularity substantially parallel to a selected optic path for each discrete light source. Light having an angularity other than the selected angularity is excluded from the conjugate image. Provision is made to fold the light paths to a C-shaped configuration to shield both extraneous light and electro-mechanical interferences from sensitive photodetector elements.

20 Claims, 6 Drawing Figures

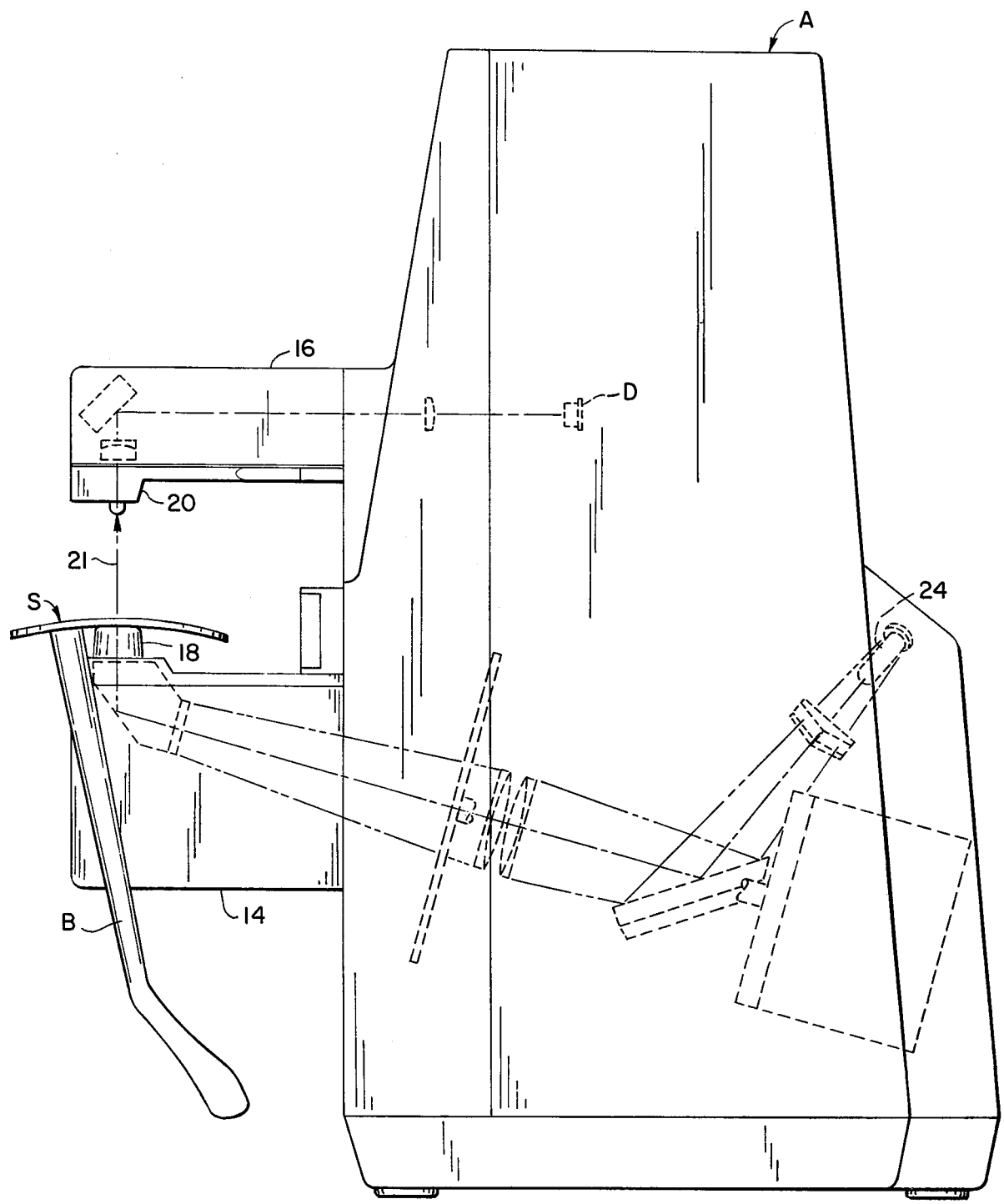
FIG._1.

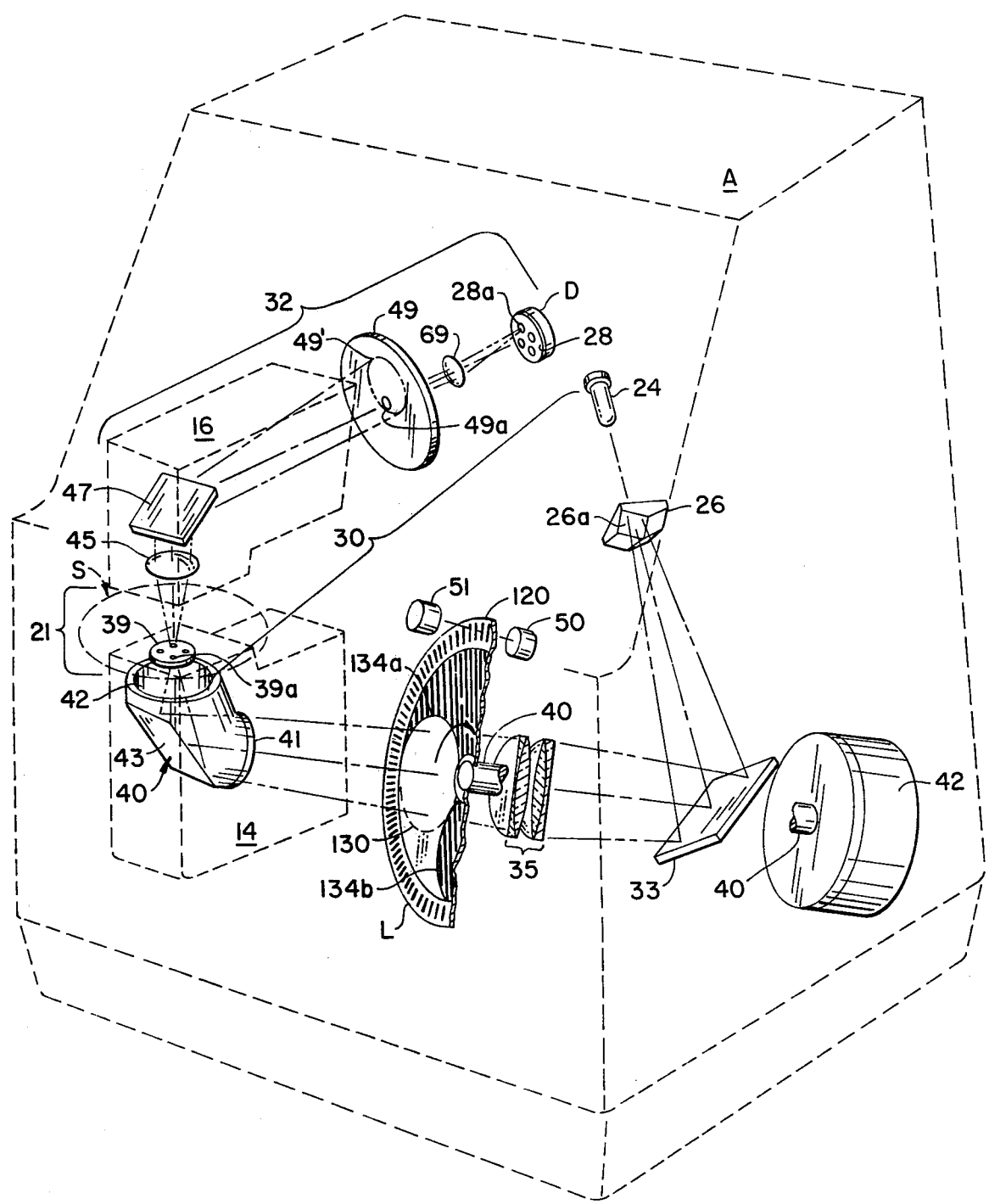
FIG._2.

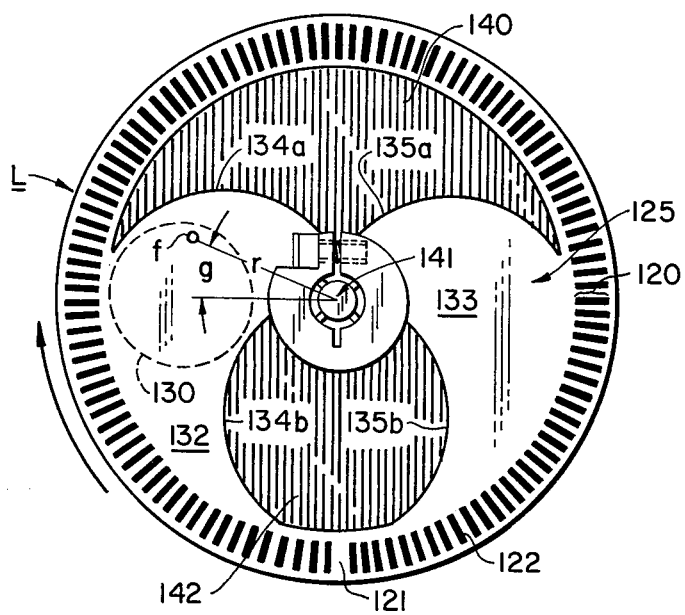
FIG.__3a.
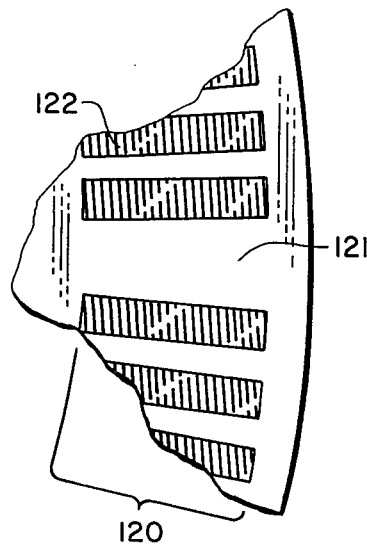
FIG.__3b.
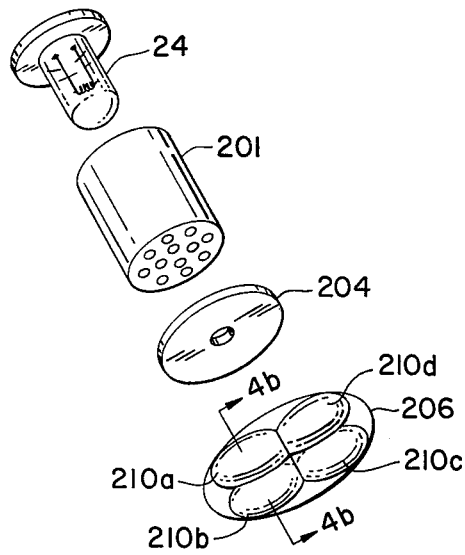
FIG.__4a.
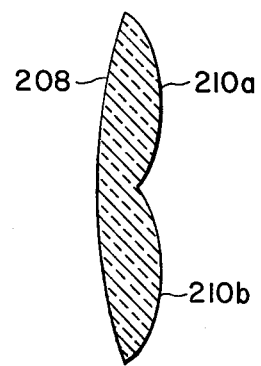
FIG.__4b.

LENSMETER UTILIZING NON-PARALLEL LIGHT

This relates to a lensmeter, and more particularly to a lensmeter which utilizes non-parallel light in detecting sphere, cylinder, cylinder axis and prism of a suspect lens system.

SUMMARY OF THE PRIOR ART

Various automated systems for measuring the power of suspect optics are known. Typically, such systems are variations of Hartman tests for the determination of lens power. In such tests, parallel or collimated light is generated from a light source and passed through the suspect optical system in discrete rays at preselected spaced apart points on a suspect lens. By tracing the deviated path of each of these rays at their points of passage through the suspect optics, lens power in sphere, cylinder, cylinder axis and prism can be determined.

Typically, such systems include a light source, collimated optics, and associated detectors. By the expedient of detecting beam migration due to deflection by the suspect optical system, lens measurement is made.

Such prior art lens systems have not been entirely free from difficulty. One of the primary sources of difficulty has been the entrance of stray light into such lens systems. For example, where a lens testing apparatus samples lenses within a room containing normal lighting, it is possible for light to enter through the lens being measured into and towards the photosensitive detector. Varying light at the photodetector can produce varying response of the measuring instrument degrading instrument accuracy.

Moreover, in many instruments, the detection of beam migration has been made at the photodetector itself. Where the photodetector is relied upon to detect beam migration, three effects can subtract from instrument accuracy.

The first effect is the impingement of stray or ambient light upon the instrument photodetector. Commonly, the impingement of stray or ambient light on the photodetector will give detector readings which erroneously average the location of the impingement of light. For example, where an instrument produced light source images on one part of the photodetector, and ambient or stray light images upon another part of the photodetector, the instrument will typically read out an indication that light has impinged upon the photodetector at a position intermediate to the two discrete areas of light impingement. This intermediate read out position can produce instrument error.

Moreover, utilization of photodetectors which receive the possible incidence of light over relatively wide areas can lead to instrument irregularity due to photodetector irregularity. Where light sources impinge upon small but variable portions of a wide photodetector surface, variations of the photodetector surface itself can result in varying readings. It is common in such photosensitive elements that these elements vary in photon sensitivity over their surface. This variation in photosensitivity produces differing readings for differing portions of the surface where beam migration due to suspect lens measurement occurs. Corresponding error due to detector surface variation can be present.

Finally, detectors have been made in which photosensitive cells are registered to positions of migration of any array of beams such as those produced by a spot diagram generator of the Nipkow disc variety. Typically, the registration of a sensitive photocell to each discrete beam of the resultant array of beams occurs. Such photodetectors and their position-sensing apparatus are subject to the difficulties of photodetector surface irregularities and misinterpretation of position where ambient light penetrates the instrument.

SUMMARY OF THE INVENTION

A unitary light source is imaged through a prism array to generate a plurality of preferably four apparent light sources forming a point of origin for a discrete lens sampling light path. From each apparent light source, each discrete sampling path diverges to a relay lens system. This relay lens system relays and registers to a lens sampling interval discrete images of each apparent light source. The images may be registered to a correspondingly apertured lens sampling diaphragm against which suspect optics are placed for measurement. A moving boundary locus sweeps the light between each apparent source and the sampling interval with paired boundaries of differing slopes which produce non-ambiguous points of intersection with respect to time. After passage through the suspect optics at the sampling interval, light is passed to a photodetector having an overlying set of apertures, each aperture corresponding to one of the four apparent light sources. A lens pair functions as relay optics to focus a conjugate image of the light at the suspect optic to the overlying apertures at the detector. Light other than that passing through the suspect optics at the point of the images of the apparent light source is excluded. Moreover, a sampling aperture in combination with one of the lenses of the relay pair, passes only that light with limited angularity substantially parallel to a selected optic path for each discrete light source. Light having an angularity other than the selected angularity is excluded from the conjugate image. Provision is made to fold the light paths to a C-shaped configuration to shield both extraneous light and electromechanical interferences from sensitive photodetector elements.

OTHER OBJECTS AND ADVANTAGES OF THIS INVENTION

An object of this invention is to disclose a lens meter in which point sampling of suspect optics occurs by using non-parallel light. According to this aspect of the invention, light emanating from a large area (either real or apparent) is focused to an image at a sampling aperture at or near the suspect optics along a conical bundle. This light before imaging is occulted in its conical bundle by a moving boundary locus. The locus sweeps the light emitting area with paired boundaries of differing slope which boundaries produce non-ambiguous points of boundary intersection with respect to positions of the moving boundary locus over the converging light before deflection at the suspect optics. When the light is deflected at the suspect optics and diverges again in a conical bundle from the suspect optics, the position of the locus at the time of occultation of selected beams in the deflected light cone can be related to the power of the suspect lens by a detector occupying a fixed position on the opposite side of the suspect optics.

An advantage of this invention is that the photodetector need not be position-sensitive or move. Rather, the photodetector need only be fixed in one position and the occultation recorded.

A further advantage of this invention is that the same area of a photodetector can be consistently used to detect occultation for varying suspect lenses. Variation of photodetector output due to migration of light detection over the photodetector surface is not present.

A further advantage of this invention is that moving parts and associated sources of interference are kept away from the photo-sensitive detector. Increased sensitivity of the photodetector results.

A further object of this invention is to disclose a photodetector having multiple light sampling apertures for suspect optics. According to this aspect of the invention, a prism array or other means of multiple imaging is placed in front of a unitary light source. The prism array produces a plurality of virtual images of the light source. Each virtual image is the point of origin for a discrete light sampling path.

An advantage of this aspect of the invention is that with three or more apparent light sources, the power of the suspect system can be readily measured in sphere, cylinder, cylinder axis and prism. Moreover, by using discrete and known light paths of a given and fixed spacial separation, each light sampling path can be readily identified.

A further object of this invention is to disclose an optical system for confining light received at the photodetector to light passing the suspect optics at the sampling apertures at or near the suspect optics. According to this aspect, a photodetector array having discrete photodetectors for each lens sampling path is placed to receive light at the end of the optic paths. Overlying each discrete photodetector of the array is a diaphragm having corresponding array of apertures, each aperture corresponding to each light path. Relay optics—preferably a pair of lenses—relays a conjugate image of the sampling apertures into registration with corresponding apertures of the diaphragm. Only light passing the suspect optics at the point of the sampling intervals is passed to the photodetector.

An advantage of the relay optics to the photodetector is light passing the suspect optics at points other than the discrete sampling apertures is excluded from passage to the photodetector.

A still further object of this invention is to limit the angularity of light received at the photodetector to a narrow and preselected range of angularity. According to this aspect of the invention, one of the relay lens pairs converges light from all of the discrete sampling apertures at the suspect lens to a single sampling aperture. This sampling aperture limits light passing to the conjugate image at the photodetector to a discrete and narrow angularity range. Light of differing angularity is not passed to the conjugate image at the photodetector.

An advantage of this aspect of the invention is that light passed to the photodetector is optically screened in two aspects. First it must pass the suspect optics at the sampling intervals. Second, the light must have a narrow range of angularity. This angularity is selected so that rays passed to the photodetector must be substantially parallel to a selected and narrow angular range. The screening of stray light out of the photodetector thus occurs both as to point of origin and angularity.

A further advantage of this invention is that the optical path can be bent to a C-configuration. An upper and opaque optical housing confronts a lower opaque optical housing with the sampling interval for the suspect optics placed therebetween. Light for sampling the suspect optics passes upwardly from the lower opaque housing through an optical path opening into the upper opaque housing member having a corresponding and confronted optical path housing. Stray light, which stray light is most commonly of downward angularity is screened by the confronted housings from direct entrance into the optical path to and towards the photodetector.

A further object of this invention is to disclose a system in which color deviation due to either lens thickness or shading is reduced. According to this aspect a prism assembly is located immediately prior to passage of the light into the suspect optics. This prism effects color dispersion of light opposite to that anticipated at the suspect lens. Typically optical blues are deviated to the inside of the optical path, reds to the outside of the optical path. Resultant deviation at the suspect optics effects a substantial recombination of the deviated path so that by the time impingement of the rays at the photodetector occurs, all rays of all colors (and wave lengths) impinge on the detector assembly with more nearly equal angularity. Alternately provision is also made to effect this same result by discrete lenses located at the prism facits. The strength of the lenses at the prism facits or the lens design at the deflecting can be modified to control the degree of chromatic correction employed.

Other objects, features and advantages of this invention will become more apparent after referring to the following specification and attached drawings in which:

FIG. 1 is a side elevational view of the optical apparatus of this system packaged within a lensmeter housing;

FIG. 2 is a perspective view of the optics of this system;

FIGS. 3a and 3b are schematics of the moving boundary locus utilized with this invention; and FIGS. 4a and 4b illustrate an alternate light source.

Referring to FIG 1, the lensmeter A of this invention is shown contained within a casing having opaque walls.

Protruding outwardly from the casing at the front thereof is a first underlying opaque housing member 14.

A second overlying opaque housing member 16 protrudes from an upper portion of lensmeter A. These housing members confront one another at respective openings 18, 20 to define a sampling interval 21 therebetween. Suspect lens S is here shown attached to frames B and registered to a bottom opening 18 of opaque housing 14 for measurement. As the light source 24 is at the origin of the light path and the detector D is at the end of the light path, it can be seen that light proceeds from opaque housing 14 upwardly to and towards opaque housing 16 in passing through suspect lens S.

It should be noted at this point that the overlying opaque housing 16 confronts lower opaque housing 14. These housings 14, 16 define sampling interval 21 therebetween. These confronted housings help prevent ambient or stray light from penetrating to photodetector D. Specifically, since most ambient lighting is angled downwardly to and towards the machine base, the shadow of opaque housing 16 will shield suspect optics S at their sampled portion from allowing light to be reflected upwardly, into and penetrating sampling interval 21 in the upward direction. It should be noted that the typical air-glass optical interface produces a reflection in the order of only four percent (although the reflection from shaded or perscriptive sunglasses may be higher). Thus, the likelihood of ambient light penetrating the lensmeter of this invention to produce an erroneous reading is minimized by the confronting housing members 14, 16 and the upward optic path of the sampling interval.

Referring to FIG. 2, the perspective view of the optical elements of this invention is illustrated, the illustration again showing the optic elements with respect to an opaque housing here shown in broken lines. Broadly, the optic path can be divided into a lower or moving boundary locus segment 30, an upper or detector segment 32 with the suspect optics sampling interval 2 therebetween. As can be readily seen, this optic path lies roughly in a vertical plane and is C-shaped in configuration. That is to say, light passes from source 24 along the bottom and substantially horizontal leg 30 to the sampling interval 21. Light is directed upwardly and on to the vertical part of the C at sampling interval 21. Light is then deflected horizontally along top horizontal portion of the C to and towards the detector D.

Stopping at this junction, it should be emphasized that the detector D can be an extremely sensitive photosensitive element. Because of this, it is desirable to shield detector D from mechanical vibration, electromagnetic interference, and stray light. By producing the C-shaped optical path herein described, it is possible to shield the lower leg of the C-shaped path from the upper leg of the C-shaped path. Not only is light confined to the optic path but electromagnetic forces and vibrational forces are effectively isolated from the photodetector D by conventional shielding (not shown).

Typically, light source 24 is a halogen cycle lamp with a filtered dc power supply. It is a singular light source, which singular light source emanates its light to and towards a prism array 26. Prism array 26 is a four-faceted prism array. This prism has the down optical path effect from light source 24 to impart four apparent sources of light origin to light source 24. These respective points of origin are all apparent virtual images. Each image forms the beginning of a discrete light path from the light source to the detector D. Detector D can be a "Pin Spot/4D" photodiode manufactured by United Detector Technology Corporation of Santa Monica, California.

Skipping ahead at this point, it will be seen that detector D includes four discrete apertures 28. Each of these apertures 28 overlies a photosensitive area of the detector D. Separate measurements are made for each separate area. Each light path is focused from the apparent image produced by prism array 26 to impinge upon a discrete area of the photodetector D. In the interest of simplicity, only one light path will be discussed. It will be understood that there are in fact four light paths. As each of the light paths is a duplicate of the remaining light paths (differing only in points of passage through the system), only one light path will be herein after completely described.

Light from a discrete facet of prism array 26 illustrated at 26a impinges upon a mirror 33. From mirror 33 the light diverges to and towards an achromatic relay optical doublet 35. The apparent virtual image received from prism facet 26a is relayed to a diaphragm aperture 39a in a diaphragm 39. Diaphram aperture 39a is the member at or near which suspect optics S are registered during measurement.

It is necessary that the diverging rays of light to doublet 35 and/or the converging rays of light from doublet 35 are swept by a moving boundary locus L. Typically, locus L is powered through a shaft 40 from a motor 42 (the shaft 40 here being broken away for clarity of understanding). A constant rotational speed motor assisted by a locus L of at least moderate rotational inertia is preferred to assure constant and unchanging angular velocity.

Shaft 40 is displaced to one side of the optical path. The optical path passes through an area of excursion 130 at the moving boundary locus L. The moving boundary locus L at its respective boundaries 134a, 134b, 135b and 135a sweeps the area of excursion 130. As these respective boundaries have differing slope defining non-ambiguous points of intersection with respect to time (see boundaries 134b, 135b of FIG. 3a, for example), a non-ambiguous point of intersection of the sweeping boundaries can be defined within the area of excursion 130 with respect to time by the moving boundary locus.

It is necessary to know the rotational position of the moving boundary locus. Therefore, a peripheral information area 120 has a light source 50 and a light detector 51 looking through area 120 to determine its rotational position.

Moving Boundary Locus

Having set forth the overall optical scheme of this invention, attention can now be directed to FIGS. 3a and 3b. Referring to FIG. 3a, a preferred embodiment of the moving boundary locus in the form of a rotating disk is illustrated.

Moving boundary locus L is made of a transparent material such as glass. The disk is provided with two broad information areas. The first such area is a border area 120 which defines disk rotation. The second area comprises the internal area 124 of the disk which occult the deflected light beams.

Border area 120 consists of a group of discrete notches or bar patterns 122 placed in a preselected angular spatial relationship around the periphery of the glass disk. In this case, they are placed at a spatial interval of 256 notches to the revolution. The function of notches 122 is for precise rotational location of the disk. When this precise rotational location of the disk is identified in combination with the impingement of light at detector 150, precise angular measurement can occur. Rotational reference is made to a missing notch at interval 121. By electronic recognition of this interval through time sensing circuitry, precise rotational positioning of locus L at time of occultation can be determined.

It should be understood that border area 120 can consist of a number of embodiments. For example, a Baldwin type digitizer disk could be used to determine precise rotation location of the moving boundary locus L. Such disks are manufactured by Baldwin Electronics, Inc. of Little Rock, Ark. as a commercial item of manufacture.

The respective beams pass through an area shown in broken lines 130. Excursion of the beams at the collector within the area is to be expected from the total vocabulary of suspect lenses S which can be placed within the meter of this invention. It is the position of the occultation of the beam which the photodetector determines and measures.

The position of the beams as they pass through the disk in area 130 can readily be determined. In explaining how this segment of the invention works, attention will first be given to the parameters of the disk and a discussion of the boundaries between the opaque and transparent areas. Secondly, the function of how these areas work will be set forth. Finally, the general case for such moving boundary locus will be explained.

Broadly, the rotating boundary locus includes two transparent areas and two opaque areas. Turning attention to the transparent areas 132, 133, each one of these areas includes a boundary which can be described by the equation $R=k\theta$ (for boundaries 134a and 134b) and $B=-k\theta$ (for boundaries 135a and 135b).

Each of the boundaries 134a and 134b on one hand, and 135a and 135b on the other hand, are separated by a precise angular interval of 90° at any given radius. Thus, it can be seen that the transparent portions of the moving disk as they pass any one spot within the area 130, pass light for one half of the time and do not pass light for the remaining one-half of the time, all this over one complete turn.

Referring to the upper opaque portion 140, it will be seen that the opaque area gradually increases in occupied angular interval with movement away from the axis 141 of the rotating boundary locus. This is because the respective boundaries 134a and 135a occupy an increasing angular interval of the disk as the distance radially outward from axis 141 increases.

Portion 142 is of the opposite construction. Specifically, the angular interval between the curves 134b and 135b decreases with outwardly moving radial distance from the axis of rotation 141.

Assuming that a beam passes through the disk at a distance r and an angle $\theta$, the passage of the beam can be intuitively understood before considering the more general case. Specifically, for changes of the distance r towards and away from axis 141, it will be seen that the time during which the beam is obscured by the respective opaque surfaces 140 and 142 can be determined. In the case of opaque surface 140, the longer the obscuration of the beam by the surface 140, the further away from the axis 141 will be the location of the beam. In the case of opaque surface 142, the shorter the obscuration of the beam, the further away from the axis 141 will be the beam. Thus, the opaque surfaces each provide discrete timed intervals which indicate the polar coordinates r of the beam away from the rotational axis 141.

Referring to the angle of the beam from axis 141, the average integrated time interval between the reference position of the disk and two opaque to transparent boundaries can be used to determine angularity. For example, by observing the boundaries 134a and 135a as they respectively occult a beam it will be observed that the angle subtended between detection of marker 121 and these obscurations will average to a value representing the azimuthal position of the beam about the axis 141. This azimuthal position can be measured with extreme accuracy. By relating this rotation interval to the precise rotational interval of the tracks 120, migration of the beam in angle $\theta$ can readily be determined.

It will be apparent that more than the four boundaries here shown can be utilized. For example, six boundaries could be used. Likewise, the opaque and transparent portions of the boundaries could be reversed.

Having set forth the migration of the beam, the more general case can now be explained.

It should be apparent to the reader that the moving path of a boundary locus according to this invention can vary widely. For example, the moving path could be linear and comprise a series of boundaries all sequentially passing the area of expected beam excursion. Likewise, the boundary locus could be painted on the exterior of a transparent revolving cylinder. Light could be deflected through the sidewalls of the cylinder with occultation of a beam occurring with boundaries painted on the cylinder sidewalls. It is to be understood that the rotational disk embodiment here shown is a preferred example.

The boundary here illustrated comprises successive opaque and transparent areas on the surface of the disk. It should be understood that absolutely transparent or absolutely opaque areas are not required for the practice of this invention. Varying surfaces can be used so long as they are all capable of passing there through a beam of light which can be intercepted without appreciable degradation by a detector. Likewsie, lights of various colors could be used in combination with color discriminatory filters. For example, a combination of lights and narrow band pass filters could be used to successively pass various beams. These beams, when passed, could be measured in timed sequence at a single detector plane.

The boundaries cannot be parallel to the intended path of movement of the boundary locus. In such a case, there would be no sweeping of the area of excursion and no detection of the beam.

It is required that the two boundaries differ with one another to be boundaries of distinctly different shape. This differing in angularity requires that each boundary sweep the area of intended beam excursion and that the two boundaries, when occultation occurs, form a common point of intersection. This common point of intersection can define the point of excursion of the beam.

Regarding the moving boundary locus, it is preferred that the boundary move at a known and constant speed. When moving at a known and reasonable constant speed, the equation for determination of the location of the beam can be reduced to one of time combined with knowledge of position from the marks 121 and 122. That is to say, by observing the time of respective occultations, precise location of the beam excursion can be measured. Once excursion is known, the resultant perscription can be obtained.

The particular configuration of the moving boundary locus illustrated in FIGS. 3a and 3b is preferred. In actual practice, the boundary can have other configurations.

As a practical matter, it is important that at least two of the boundary contours must be employed. The slope of one of these boundary contours must be algebraically larger than the other with respect to the direction of translation of the boundary across the light path. Such a slope gives the boundaries a non-ambiguous point of intersection, which non-ambiguous point of intersection insures accurate location of the beam within a suspected area of excursion, for example, the area 130 in FIG. 2.

It has been found convenient that the slope not change its sign. If the slope is chosen so that a sign change occurs, it will be found that the resultant function is non-monotonic. That is to say, the value of one component producing the slope decreases instead of increases over the area of excursion. This produces difficulty of solution of the resultant equations.

Naturally, the boundary can be described with respect to polar coordinates—where the boundary is rotated as shown in the preferred embodiment; or Cartesian coordinates—where the boundary is merely translated by the light beams with the respective opaque and transparent areas defining boundaries described by the conventional X, Y description.

Where the boundary is one that rotates, the slope $d\theta/dr$ of one boundary must be algebraically larger than the other. Obviously, this is where translation occurs in the direction $\theta$.

Where the boundary is translated in the X direction in a Cartesian system, the slope $dx/dy$ of one boundary must be algebraically larger than the corresponding slope for the other boundary.

It is an important limitation that each boundary sweep over the expected area of excursion. Naturally, where the boundary does not completely sweep the expected area of excursion, the limitations of this general condition would not be met.

Attention should also be directed to the number of sampling apertures which the system utilizes. Where two sampling apertures are used, there would be insufficient information present to generate a lens solution, unless registration to a principal axis of the suspect lens system could occur. Where three apertures are present, the solution in sphere, cylinder, cylinder axis and prism components can result. Where four apertures are present, the functions of power variation across the surface can be derived from the system.

Having described the parameters of the moving boundary locus, attention can now be devoted to the diaphragm 39 and each of the four shown diaphragm apertures, the aperture 39a being utilized as an example.

Relay doublets 35 focus an image of the virtual light images of light sources 24 to each of the discrete apertures in aperture diaphragm 39. Aperture 39a is an example. Preferably, the point of focus at the diaphragm is 15 mils in diameter. An optimum range of each of the apertures could be from 10 to 60 mils with an aperture as small as 5 mils and an aperture as large as 100 mils operable.

It should be noted that the upper and lower limits of the aperture size in diaphragm 39 are controlled by two parameters. Where the aperture becomes smaller, diffraction phenomena can be present. With diffraction phenomena, the downstream light path to detector D becomes distorted or broadened.

Where the aperture 39a in diaphragm 39 increases in size, an increasing sample of a lens will be taken. As most lenses vary in optical deflection over their surface areas, the downstreams cones of light will be correspondingly distorted as the sample area increases. It has been found that with eyeglasses once this area exceeds 100 mils, optical distortion prevents sensing by occultation by moving boundary locus L with accuracy.

It should be noted that the individual apertures 39a are not essential to operation, as the localization of the spots by relay optics 35 can be satisfactory. The utility of the apertures 39 lies in allowing less sophisticated design of optics between disk L and light source 24.

Light emanating from light source 24 to and towards the respective apertures in diaphragm 39 is typically deflected by a prism 40. Prism 40 includes a first aperture 41 normal to the incoming optical path and a second aperture 42 normal to the outgoing path with a reflective surface 43 therebetween.

Typically, the rays of light are focused from the apparent image of light 24 to converge to a pupil or point at the suspect optics S. Suspect optics S will deflect the light downstream from the suspect optics S; deflection of the entire cone of light occurs at this juncture.

At this point, discussion of the effect of the moving boundary locus L can be made.

Looking through aperture 39a and towards the virtual image of light source 24 seen through facet 26a of prism array 26, it will appear as if the entire optical doublets 35 are illuminated. When moving boundary locus L rotates, boundary 134a will sweep across the area 130. Occultation of the lighted relay doublets 35 will occur. This occultation will sweep across doublets 35 until they are completely obscured from view by the opaque area 32. For each of the respective boundaries 135b, 135a and 134a and 134b, successive occultations will occur. Downstream of the diaphragm at sampling interval 21 a reversed image of the occultation will occur. The shadow of the respective sweeping boundaries will pass across the diverging light cone.

Assuming that this diverging light cone is deflected by the suspect optics S and detector D remains stationary, occultation will be detected at differing times.

Having set forth generally the function of the moving boundary locus and the deflection of the resultant beam at the suspect optics S, attention can now be devoted to the light screening characteristics of this invention. First, the function of paired lenses 45 and 69 to relay a conjugate image will be set forth. This relayed conjugate image is of the aperture plate 39 to the plate 28 overlying detector D.

Second, lens 45 in combination with diaphragm plate 49 will be discussed. This lens will be shown to be chosen so that light rays of narrow range of angularity are passed to the detector D. The resultant combinations will be illustrated to screen most ambient stray light out of impingement onto the photodetector D.

Referring to FIG. 2, aperture plate 39 is shown with four discrete apertures, the aperture 39a being illustrative. The image of the aperture plate is relayed through two lenses to the photodetector D. The first lens is lens 45. This lens reduces the divergence of the light emanating from aperture plate 39. The light then passes to a second relay lens 69. Second relay lens 69 passes a conjugate image of the aperture plate 39 to the aperture plate 28 overlying the photodetector D, which is typically a photodetector array having four photosensitive areas. Each of the photosensitive areas unerlies one of the apertures in plate 28, the aperture 28a being illustrative.

Relay lenses 45, 69 relay a conjugate image of plate 39 into registry with plate 28. Respective and corresponding apertures in plage 39 are registered with images of the apertures in plage 28. As is here shown for example, aperture 39A is registered to aperture 28a. As a matter of practicality in operation and adjustment, the size of the conjugate image of 28a is made somewhat larger than size of corresponding aperture 39a.

It will be immediately realized that penetration of ambient light to the photodetector D is restricted. Specifically, it is restricted to light originating at and passing through suspect optics S at each of the apertures in plate 39. Light originating at other points on the suspect optics S cannot optically penetrate the system.

The bifurcation of the relay lens system into lenses 45 and 69 has a result that is not immediately apparent. Specifically, by bifurcating the relay lens pair into two discrete lenses, the first of these lenses, lens 45, can be utilized for an additional function. This function is to limit greatly the accepted angularity of light having impingement onto the photodetector D.

According to this latter aspect of the invention, light emanating to lens 45 is reduced in its divergence. This light impinges upon aperture plate 49. The single and central aperture 49a passes the light path for each and all of the discrete apparent light sources to the respective apertures in plate 28a overlying detector D.

Aperture 49a typically only allows light of a very narrow range of angularity to penetrate through and to lens 69. As penetrating through and to lens 69, light of a very narrow range of angularity is thus accepted at the photodetector D and penetrates the here illustrated aperture 28a and plate 28.

It will be immediately realized that optical screening in a second aspect occurs. Even though stray or ambient light may penetrate suspect optics S at an area overlying one of the apertures of diaphragm 39, such light must be restricted to a narrow angularity. This angularity must be substantially parallel to the optical axis for each light path to detector D. If the light passes without this preselected and narrow range of divergence permitted by aperture 49a and lens 45, blocking of the light from impingement upon the opaque surface diaphragm 49 will occur. This is illustrated at light bundle 49' shown impinging upon the diaphragm 49.

It will be appreciated that the phenomena of optical screening of lenses 45, 69 in combination with an aperture within a diaphragm 49 is complementary to the underlying optical shading effects of opaque housings 16, 14. The combination of the light screening provided by these separate phenomenon drastically reduces penetration of stray light into the system.

In operation, it will be remembered that the apparently illuminated surface of the optical doublets 35 are swept by the respective boundaries of locus L. This light converges in a conical path to the suspect optics S along a conical path having an apex at the suspect optics. The suspect optics S causes a deflection. This deflection is of the entire cone of light emanating downstream along a conical path from the aperture 39a in diaphragm 39. Such a deflection of the cone of light has been illustrated by deflected cone 49' on diaphragm 49'. Detector D will then look for rays with a specific alignment. This portion of the deflected cone of light 49 will be looked to for occultation. When occultation is observed, it can be related to the position of the moving boundary locus L. Being related to the position of the moving boundary locus L, the power of the suspect optical system can be measured in sphere, cylinder, cylinder axis and prism.

For such measurement, I hereby cross-reference as if fully set forth herein my copending U.S. Pat. application Ser. No. 813,211 filed 7/5/77 entitled Lens Meter With Automated Readout, filed concurrently herewith. This application contains a more precise description of the moving boundary locus L and its function. This patent application is abstracted as follows:

An automated readout for a lens meter is disclosed in combination with a light beam deflecting type of lens meter such as that of a Hartman test. In such a light beam deflecting type of lens meter, a light source having one or more beams is passed through a suspect optical system and deflected by the suspect optical system to a deviated path. Measurement of the deviated path within a preselected area of excursion is typically equated to various powers of the suspect optical system in sphere, cylinder, cylinder axis, and prism. The invention provides for a means of measurement of deviated paths and includes a moving boundary locus with edges of distinctly different shape placed to intercept and occult said deflected beam in a known plane within the area of excursion at a distance from the suspect optical system. The moving boundary locus is typically arranged for movement along a predetermined path at a velocity within the known plane. The boundary locus includes a first substantially transparent portion, a second substantially opaque portion, and at least two boundaries between the opaque and transparent portions. Each of the two boundaries defines a unique non-ambiguous intersection within the area of excursion of each position of the beam and sweeps the preselected area of excursion at differing angularities with respect to the predetermined path of said moving boundary locus. The beam after leaving the moving boundary locus is reimaged to a photosensitive detector. By the expedient of measuring the position of the moving boundary locus when the moving boundary occults the beam for two of the boundaries, the amount of beam exursion can be measured and related to optical system measurement. The detector is provided with a circuit which averages the two detector states provided by occultation. This enables lens systems of varying light transmissivity to be measured."

A representative patent claim is as follows:

"1. In the combination of a suspect optical system for measurement of deflection, a light source emanating a beam passed through said suspect optical system and deflected by said suspect optical system to a deviated beam path for measurement within a preselected area of excursion; and, means for measurement of said deviated path, the improvement in said means for measurement of said deviated path comprising: a moving boundary locus placed in a known plane at a preselected distance from said suspect optical system; said moving boundary locus arranged for sweeping movement along a predetermined path within said known plane, said boundary locus including a first portion, a second portion and at least two boundaries therebetween of distinctly different shape with each of said boundaries sweeping at differing angularities with respect to the predetermined path of said moving boundary locus; means for sweeping said moving boundary locus along said predetermined path for producing occultation of said beam by said boundaries; a photosensitive detector aligned to receive said beam; and, means for measuring the position of said moving boundary locus when said detector detects produced occultation of said light beam at said boundaries of said moving boundary locus whereby at least one measurement of each of said moving boundaries of said moving boundary locus at the time of detector detection of occultation measures the excursion of said beam due to deflection by said suspect optics."

It will be appreciated that suspect optics commonly provide for chromatic dispersion. Typically, eyeglasses are not achromats. This being the case, color dispersion can result.

With respect to the photodetector seen here illustrated, color dispersion can produce differing results. Specifically, light rays of differing wavelengths will migrate to different points of excursion resulting in the detected occultations for different light wavelengths occuring at different timed intervals. In order to avoid this, this invention includes a system of chromatically compensating the light before it enters into the suspect optics S. First, the light is chromatically dispersed before entrance into the suspect optics. At the suspect optics S, an average redeflection of the chromatically dispersed light occurs. The light is usually recombined on an averaged basis by the suspect optics so that impingement at detector D is preferably achromatic.

Referring to FIG. 2, prism 40 therein illustrated does affect some of the previously described chromatic dispersion of the light. Typically, light rays in the blue spectra are deviated to and towards the central portion of the diaphragm 39. Light rays in the red wavelength are deviated away from the central portion of the diaphragm 39.

On passing through the suspect optics S, a compensating effect occurs. Typically, the light rays in the red wavelength are deviated to a lesser extent because of the lower index of refraction for red light; light rays in the blue wavelength are deviated to a greater extent. On the other hand the base distance for red is increased as compared to blue producing increased angle differences for red. These two effects can be arranged to largely cancel, causing all wavelengths to produce deflections resulting in the same lens parameter estimates. A recombination at the photodetector D occurs.

In actual fact, the chromatic effect produced by the prism 40 constitutes approximately one-half of the total chromatic correction according to this method. Other achromatic effects can be introduced by the lens assembly in front of the light source 24 illustrated specifically in FIGS. 4a and 4b.

With respect to light source 24, a fiber optic bundle 201 is shown in front of the light source. Fiber optic bundle 201 effects a substantial homogenization of light emanating from light source 24 and effectively eliminates any filament "hot spots" that can occur.

Typically, light passes from fiber optic bundle 201 through a localizing aperture 204. Aperture 204 appears as a source from which light emanates. Fiber optical bundle 201 can as well be replaced by a translucent light emitting surface. The surface will be adequate so long as any filament "hot spots" are substantially homogenized so that light passing downstream to the respective apparent images is substantially homogeneous and uniform. Light thence passes to a lens 206 having special optical characteristics.

Lens 206 has a positive rear surface 208. The front surface of this lens comprises four discrete and smaller positive lens surfaces 210a, 210b, 210c and 210d. These respective surfaces perform two discrete functions.

First, the discrete surfaces form four apparent points of origin for the light source 24 as homogenized by the elements 201, 204. Second, the four discrete and smaller positive lens surfaces 210a–210d all reside at a preselected quadrant of the positive rear surface 208. These offset spherical lens surfaces impart a prismatic chromatic dispersion to the light. This chromatic dispersion takes the red portion of the spectrum to the outside of the optical path and the blue portion of the spectrum to the inside of the optical part for each discrete light path. This minor chromatic dispersion is essentially reconstituted by the suspect optics S at the sampling interval 21. Coincidence of the light at the photodetector D occurs on an averaged basis.

The words "conical" and "conical bundle" are used in the claims. These terms broadly refer to any converging and diverging optical bundle with a pupil at the suspect optics. These terms are intended to cover the case where the emission area is other than circular. For example, the emission area could as well be square or rectangular.

It will be appreciated that this invention will admit of a number of embodiments. The utilization of non-parallel light for detection of beam migration can be practiced without the optical screening concepts disclosed for the detector D. Electrical equivalents to a mechanical moving boundary locus, which produce meoving areas of light and dark, such as a changing cathode ray tube display, may be substituted. Likewise other modifications can be made without departing from the spirit of the invention.

What is claimed is:

1. In combination, means for emanating light from a discrete light emitting area; a moving boundary locus including at least one boundary for occulting said discrete light emitting area; a sampling interval to which suspect optics may be placed for deflecting light passing through said sampling interval; means for converging light from said light emitting area to a bundle of non-parallel light rays having a pupil located coincident with said suspect optics located in said sampling interval to which suspect optics may be placed for deflecting said light, said light diverging as deflected in a diverging bundle from said suspect optics at said sampling interval; a light path downstream from said sampling interval to receive at least a portion of said light from said suspect optics; and a photodetector fixed in space with respect to said downstream light path located within an area of expected excursion of said light from said sampling interval to detect changes of occultation of said light path by said moving boundary locus.

2. The invention of claim 1 wherein said means for emanating includes a light source; a relay lens system for relaying an image of said light source to said sampling interval substantially coincident with the placement of said suspect optics in said sampling interval and where said relay lens produces an illuminated discrete light emitting area for occultation by said locus.

3. The invention of claim 1 and wherein said means for emanating light includes a discrete area having a diffuse light emitting plane of given area; and an aperture substantially coincident to said sampling interval at the position of placement of said suspect optics for producing a conical bundle of light passing from said diffuse light source to said suspect optics.

4. A lensmeter utilizing non-parallel light comprising in combination: means for emanating light in a non-parallel light bundle to and towards an optical path; a locus sweeping said light bundle including at least one occulting boundary for occulting from one side of said bundle to the other side of said bundle; a sampling interval within said optic path for the placement of suspect optics for deflection of light by said suspect optics at said sampling interval; means to converge light from said light bundle to the sampling interval along a converging optical path with an apex coincident to said suspect optics placed within said sampling interval; an optical path communicated to said suspect optics for permitting deflected non-parallel light to pass from said suspect optics along a diverging and deflected bundle from said sampling interval at said suspect optics; a detector fixed in position with respect to said downstream optical path for receiving a portion only of light deflected by said optic path.

5. The invention of claim 4 and wherein said means for emanating light includes a point light source; and relay optics for relaying an image of said light source to said sampling interval whereby said relay optics passes a non-parallel light bundle to and towards said optic path.

6. The invention of claim 4 and wherein said means for emanating light includes a light source; and a light diffuser placed between said light source and said sampling interval; and an aperture at said sampling interval juxtaposed to the placement of said suspect optics for transmitting light from said light source to said photodetector along a conical bundle.

7. A lens meter comprising in combination a light source; means for emitting a plurality of virtual images of said light source; a sampling interval along an optical path from said light source for the placement of suspect optics for measurement; relay optics for relaying each said virtual image of said light source to the sampling interval, said image of each virtual light source being juxtaposed to the position of suspect optics at a sampling segment and diverging from said suspect optics as a conical bundle from an apex at said sampling segment; the sampling segment for each said path being spaced apart from sampling segments for other paths; a moving boundary locus placed intermediate said light source and said sampling interval for and including at least first and second nonambiguous boundaries for occulting light passing between said light source in sampling interval; discrete optical paths from each said sampling interval, each said optical path permitting excursion of light emanating from and deflected by said suspect optics as a deflected and diverging bundle; and at least one fixed detector in said light path to measure occultation of said deflected light.

8. The lens meter of claim 7 and wherein said means for emitting includes a prism array having a plurality of facets.

9. The lens meter of claim 7 and wherein said means for emitting includes first and second spherical lens surfaces mounted eccentrically for each said discrete light path.

10. The invention of claim 7 and wherein each discrete light path from said sampling interval is emanated to an aperture between said sampling interval and said detector; said detector including a plurality of photosensitive segments in an array, each of said segments aligned with respect to said aperture to permit each discrete light beam in passing through said aperture to be aligned to a discrete segment of said photodetector.

11. The invention of claim 7 and including overlying and underlying confronted opaque optical housings having light passageways for emanating light to and from said sampling interval, said housings confronted to define a spatial interval therebetween for said sampling interval; said underlying optical housing including light emanating from said light source with said moving boundary locus occulting said relay optics within said lower opaque light housing; said upper opaque optical housing including said fixed detector; whereby said upper housing confronted to said lower housing shields said suspect optics at said sampling interval from ambient down lighting.

12. In combination, means for emanating light from a source; a moving boundary locus including at least one boundary for occulting said light; a sampling interval to which suspect optics may be placed for deflecting light passing through said sampling interval; means for producing light from said light emanating means having a bundle of non-parallel light rays converging to a pupil located coincident with said suspect optics located in said sampling interval to which suspect optics may be placed for deflecting said light, said light diverging as deflected in a non-parallel bundle from said suspect optics at said sampling interval; a light path downstream from said sampling interval to receive at least a portion of said light from said suspect optics; and a photodetector fixed in space with respect to said downstream light path located within an area of expected excursion of said light from said sampling interval to detect changes of occultation of said light path by said moving boundary locus produced by excursion of said bundle of light from said suspect optics, a diaphragm with at least one aperture overlying said photodetector; means for relaying a conjugate image of said pupil to said aperture of said diaphragm whereby ambient light at said suspect optics at positions other than said pupil is substantially excluded from receipt at said photodetector.

13. The combination of claim 12 and wherein said means for relaying includes first and second spaced apart relay lenses.

14. The combination of claim 12 wherein said means for producing light from said light emitting means includes means for imaging said light along a plurality of paths, each path having non-parallel light converging to a separate pupil located at said suspect optics.

15. In combination, means for emanating light from a source of non-parallel light; a moving boundary locus including at least one boundary for occulting said non-parallel light; a sampling interval to which suspect optics may be placed for deflecting light passing through said sampling interval; means for producing light from said emanating means having a bundle of non-parallel light converging to a pupil located coincident with said suspect optics located in said sampling interval to which suspect optics may be placed for deflecting said light, said light diverging as deflected in a non-parallel bundle from said suspect optics at said sampling interval; a light path downstream from said sampling interval to receive at least a portion of said light from said suspect optics; and a photodetector fixed in space with respect to said downstream light path located within an area of expected excursion of said light from said sampling interval to detect changes of occultation of said light path by said moving boundary locus produced by excursion of said bundle of light from said suspect optics; a diaphragm having an aperture at a preselected distance from said photodetector; and means for converging said diverging light emanating from said pupil at said suspect optics whereby light of a preselected angularity only can reach said photodetector.

16. The combination of claim 15 and wherein said means for producing light from said light emitting means includes means for arranging said light along a plurality of bundles, each bundle being conical and converging to a separate pupil located at said suspect optics and each said bundle passing through said central aperture of said diaphragm.

17. In combination, means for emanating light from a source; a moving boundary locus including at least one boundary for occulting said light; a sampling interval to which suspect optics may be placed for deflecting light passing through said sampling interval; means for producing light from said emanating means having a bundle of non-parallel light to a pupil located coincident with said suspect optics located in said sampling interval to which suspect optics may be placed for deflecting said light, said light diverging as deflected in a non-parallel bundle from said suspect optics at said sampling interval; a light path downstream from said sampling interval to receive at least a portion of said light from said suspect optics; and a photodetector fixed in space with respect to said downstream light path located within an area of expected excursion of said light from said sampling interval to detect changes of occultation of said light path by said moving boundary locus produced by excursion of said bundle of light from said suspect optics; a first diaphragm with at least one aperture overlying said photodetector; first and second lens means for relaying a conjugate image of said pupil to said aperture of said first diaphragm whereby ambient light at said suspect optics at positions other than said pupil is substantially excluded from receipt at said photodetector; a second diaphragm having an aperture at a preselected distance from said photodetector; said second diaphragm functioning with said first lens means to permit light of a second and narrow angularity to pass to said photodetector.

18. In combination, means for emanating light; a moving boundary locus including at least one boundary for occulting said light; a sampling interval to which suspect optics may be placed for deflecting light passing through said sampling interval; means for producing light from said light emanating means having a bundle of non-parallel light to a pupil located coincident with said suspect optics located in said sampling interval to which suspect optics may be placed for deflecting said light, said light diverging as deflected in a non-parallel bundle from said suspect optics at said sampling interval; a light path downstream from said sampling interval to receive at least a portion of said light from said suspect optics; a photodetector fixed in space with respect to said downstream light path located within an area of expected excursion of said light from said sampling interval to detect changes of occultation of said light path by said moving boundary locus produced by excursion of said bundle of light from said suspect optics and means for chromatically dispersing said light before impingement to said suspect optics in a manner to allow compensation for the chromatic variation in power of the suspect optics.

19. The combination of claim 18 and wherein said chromatic dispersing means includes a prism.

20. The combination of claim 18 and wherein said chromatic dispersing means includes first and second eccentrically mounted spherical lenses.

* * * * *